(12) United States Patent
Wei (10) Patent No.: US 11,032,369 B1
(45) Date of Patent: Jun. 8, 2021

(54) SYSTEM AND METHOD FOR NON-DISRUPTIVE MIGRATION OF SOFTWARE COMPONENTS TO A PUBLIC CLOUD SYSTEM

(71) Applicant: AVIATRIX SYSTEMS, INC., Palo Alto, CA (US)

(72) Inventor: Xiaobo Sherry Wei, Palo Alto, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 0 days.

(21) Appl. No.: 16/114,150

(22) Filed: Aug. 27, 2018

Related U.S. Application Data

(60) Provisional application No. 62/551,147, filed on Aug. 28, 2017.

(51) Int. Cl.
*H04L 29/08* (2006.01)
*H04L 29/12* (2006.01)

(52) U.S. Cl.
CPC ...... *H04L 67/1097* (2013.01); *H04L 61/2007* (2013.01); *H04L 61/6022* (2013.01)

(58) Field of Classification Search
CPC . H04L 67/10–1097; H04L 61/10–6022; H04L 61/6095
See application file for complete search history.

(56) References Cited

U.S. PATENT DOCUMENTS

| | | | |
|---|---|---|---|
| 6,167,052 A * | 12/2000 | McNeill | H04L 12/467 370/399 |
| 2012/0311568 A1* | 12/2012 | Jansen | G06F 9/45558 718/1 |
| 2013/0205025 A1* | 8/2013 | Shamsee | H04L 63/0272 709/225 |
| 2014/0149591 A1* | 5/2014 | Bhattacharya | H04L 67/1097 709/226 |
| 2014/0289198 A1* | 9/2014 | Chikkalingaiah | G06F 16/214 707/634 |

(Continued)

OTHER PUBLICATIONS

Bifulco, Roberto "Transparent migration of virtual infrastructures in large datacenters for Cloud Computing", IEEE, pp. 179-184 (Year: 2011).*

*Primary Examiner* — Clayton R Williams
(74) *Attorney, Agent, or Firm* — Rutan & Tucker, LLP (57) ABSTRACT

One embodiment of the invention features a system including a first gateway and a second gateway that operate in concert to support a migration of a software component from an on-premises network to a public cloud network while preserving an Internet Protocol (IP) address assigned to the software component. The first gateway deployed as part of the on-premises network, and the second gateway deployed as part of the public cloud network. The first and second gateways are in communication via a secure communication path. To support migration of the software component to the public cloud network while retaining its IP address, the second gateway is configured to resolve a media access control (MAC) address for an on-premises host connected to the on-premises network. Similarly, the first gateway is configured to resolve a MAC address for a cloud host connected to the public cloud network.

27 Claims, 4 Drawing Sheets

(56) References Cited

U.S. PATENT DOCUMENTS

| | | | |
|---|---|---|---|
| 2015/0096011 A1* | 4/2015 | Watt | H04L 63/0272 726/15 |
| 2016/0105392 A1* | 4/2016 | Thakkar | H04L 61/6022 709/220 |
| 2016/0105393 A1* | 4/2016 | Thakkar | H04L 67/10 709/220 |
| 2016/0352682 A1* | 12/2016 | Chang | H04L 67/1097 |
| 2017/0277555 A1* | 9/2017 | Gautam | G06F 9/45558 |
| 2020/0382471 A1* | 12/2020 | Janakiraman | H04L 61/6068 |

* cited by examiner

SYSTEM AND METHOD FOR NON-DISRUPTIVE MIGRATION OF SOFTWARE COMPONENTS TO A PUBLIC CLOUD SYSTEM

CROSS-REFERENCE TO RELATED APPLICATIONS

This application claims the benefit of priority to U.S. Provisional Application No. 62/551,147, filed Aug. 28, 2017, the entire contents of which are incorporated by reference herein.

FIELD

Embodiments of the disclosure relate to the field communications. More specifically, one embodiment of the disclosure relates to a system and method for supporting migration of a software component to a cloud computing platform while preserving its Internet Protocol (IP) address.

GENERAL BACKGROUND

Over the last few years, cloud computing has provided an Infrastructure as a Service (IaaS), where virtual resources are provided in the cloud and made accessible to tenants as a service. One of these services allows tenants to (i) upload on-premises software components (e.g., executables such as software applications, virtual machines, etc.) to a cloud computing service, and subsequently, (ii) run the software components from the cloud computing platform. As a result, the cloud computing platform enables cloud providers to pool software components to be shared and used on demand by users associated with the tenant. One type of cloud computing platform is a public cloud, which constitutes a cloud computing infrastructure hosted and maintained by a cloud provider such that any tenant (e.g., individual, enterprise, or other entity) may purchase the right to perform processing on the provider's infrastructure. Examples of different types of public cloud platforms may include, but are not limited or restricted to Amazon Web Services® (AWS), Microsoft® Azure®, and Google Cloud®.

In migrating an on-premises application to a public cloud platform, a tenant may rewrite the application on the public cloud platform or may logically move the entire disk that hosts the application to the public cloud platform and boot the disk after logical placement of the disk as part of the public cloud platform. Both of these approaches face a number of challenges involving connectivity.

For instance, a first challenge may involve a connectivity dependency risk. In particular, in certain situations, an on-premises application may need to communicate with an application that has been migrated to a public cloud platform and a local version of the application has been deleted. If any on-premises application previously used a hard-coded, private Internet Protocol (IP) address to communicate with the recently migrated application and an IP address of the migrated application has changed, the on-premises application will have no connectivity with the migrated application.

A second challenge may involve a security policy dependency risk. Similar to connectivity dependencies, an on-premises network may feature security mechanisms such as a firewall. The firewall operates in accordance with firewall rules, some of which may control connectivity to the on-premises network. Therefore, in response to assigning a different IP address to the migrated software application, security policies of the public cloud platform need to be updated to maintain the connectivity model. Otherwise, packets directed to the on-premises network from the migrated application will be dropped, precluding utilization of the migrated application until the firewall rules are updated.

As a result of the foregoing, the migration of software applications to a cloud computing platform, such as a public cloud platform for example, is complex for a large scale migration. Such migration may require certain on-premises software applications and/or on-premises security mechanisms to be manually updated after each migration phase. This manual updating is prone to human error and is not conducive to automation given the customization needed for each migrated application.

Besides the enumerated difficulties in migration of software to a public cloud platform, it is recognized that the underlying infrastructure of public cloud platforms (hereinafter, "underlying public cloud infrastructure") fails to provide robust support in handling multicast traffic, which poses a significant problem if IP address preservation is attempted for software components migrated to the public cloud platform.

Software components operating within the same subnet address range tend to communicate through Open Systems Interconnection (OSI) Layer 2 (L2) messages. L2 messaging relies on hardware (link layer) addresses such as Media Access Control (MAC) addresses. To resolve a MAC address for a system targeted to receive communications from a sending system on the same subnet, the sending system may broadcast (or multicast) an Address Resolution Protocol (ARP) request to discover the destination MAC address. Unfortunately, the underlying infrastructure of a public cloud platform (hereinafter, "underlying public cloud infrastructure") usually drops or fails to respond to ARP requests associated with systems unknown to the underlying public cloud infrastructure. This creates a problem when trying to implement a subnet across an on-premises network and a public cloud network because systems residing in an on-premises network are unknown to the public cloud platform. Therefore, ARP Request messages at least from systems residing at the on-premises network are dropped, disrupting communications between the migrated software components and the software components running on the on-premises subnet.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Embodiments of a system and method for supporting migration of a software component from an on-premises (local) network to a cloud computing platform while preserving an Internet Protocol (IP) address assigned to that software component is described. Herein, according to one embodiment of the disclosure, the system for migrating a software component (e.g., a software application, virtual machine "VM," etc.) to the cloud computing platform features (i) a first gateway deployed as part of a first network (e.g., an on-premises network) and (ii) a second gateway deployed as part of a second network (e.g., public cloud network). The first gateway and the second gateway are configured to establish a secure communication path there between, which extends a subnet of the on-premises network to the public cloud network. Based on the system architecture described below, the on-premises network shares a subnet IP address range (e.g., Classless Inter-Domain Routing "CIDR" block) with the public cloud network; address control logic is deployed within the second (cloud) gateway to resolve linked layer addressing of an on-premises host and address control logic is deployed within the first (on-premises) gateway to resolve linked layer addressing of a cloud host; and data control logic (e.g., network address translation logic) is deployed within the gateways to permit routing of messages from hosts on the same subnet, so any on-premises network logic may communicate with the migrated software component maintained by the cloud computing platform as if the software component still resides as part of the on-premises network.

More specifically, operating as virtual appliances for example, the first gateway is deployed on a subnet from which a software component is to be migrated. The second gateway is launched on a virtual public cloud (VPC) subnet to establish a bi-directional secure communication channel between the first and second gateways. Thereafter, an instance of the software component is migrated from the subnet of the first network (hereinafter, "on-premises subnet"); namely, the instance of the software component (also referred to as "migrated software component") is installed on a public cloud platform while preserving the previously assigned IP address and this software component may be removed from local storage accessible via the on-premises network. Hence, for this embodiment of the disclosure, the migrated software component would feature the same IP address as the IP address of the software component prior to migration, and thus, any on-premises host will be able to communicate with the migrated software component as if the software component still resided locally.

Herein, according to one embodiment of the disclosure, in order to resolve a link layer address of the on-premises host to effectuate communications from a source host deployed in the public cloud platform (hereinafter, "source cloud host"), a proxy network interface for each host in the on-premises subnet may be provided as part of the second (cloud) gateway in the cloud subnet with the same IP address. This allows the public cloud infrastructure to become aware of on-premises hosts and respond to ARP requests from the source cloud host. The proxy network interface is configured to communicate with source cloud host on behalf of the on-premises hosts and exchange content (e.g., one or more packets or other types of digital data) between the cloud host and the on-premises host.

Similarly, in order to resolve a link layer address (e.g., MAC address) of the cloud host (e.g., hosting migrated software component), the first (on-premises) gateway is configured to respond to an ARP request, which originated from an on-premises host seeking to communicate with the cloud host, with an ARP replay message including a MAC address of the second (cloud) gateway (hereinafter, "cloud gateway MAC address").

After both the cloud host and the on-premises host have been resolved, network address translation (NAT) logic may be used by both the first gateway and the second gateway for routing of data packets between an implementation of a subnet across the on-premises network and the public cloud network. More specifically, the first gateway includes NAT logic that is configured to translate an IP address of the subnet to an IP address of a phantom subnet before routing each data packet to the second gateway. More specifically, the NAT logic for the first gateway is configured to translate an IP address each data packet from the on-premises host residing within a subnet (e.g., IP address 172.16.0.181, for subnet 172.16.0.0/24) to an IP address for the phantom subnet (e.g., Phantom IP address 1.1.1.181, for phantom subnet 1.1.1.0/24). Thereafter, the first gateway routes the translated data packet(s) are received by the second gateway. Similarly, the second gateway includes NAT logic that is configured to translate the IP address of the data packet from its IP phantom subnet address (e.g., Phantom IP address 1.1.1.181, for phantom subnet 1.1.1.0/24) to the IP subnet address (e.g., IP address 172.16.0.181, for subnet 172.16.0.0/24). This translation is performed to enable the routing of data packets over the same subnet.

I. Terminology

In the following description, certain terminology is used to describe features of the invention. In certain situations, the terms "logic" and "component" is representative of hardware, firmware, and/or software that is configured to perform one or more functions. As hardware, the logic or component may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic or component may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "computerized" generally represents that any corresponding operations are conducted by hardware in combination with software and/or firmware.

The term "host" may be construed as a virtual or physical logic. For instance, as an illustrative example, the host may correspond to virtual logic in the form of a software component (e.g., a virtual machine), which is assigned a hardware address (e.g., a MAC address) and an IP address within an IP address range supported by to a particular IP subnet. Alternatively, in some embodiments, the host may correspond to physical logic, such as an electronic device that is communicatively coupled to the network and assigned the hardware (MAC) address and IP address. Examples of electronic devices may include, but are not limited or restricted to a personal computer (e.g., desktop, laptop, tablet or netbook), a mobile phone, a standalone appliance, a sensor, a server, or an information routing device (e.g., a router, brouter, etc.). Herein, the term "on-premises host" corresponds to a host residing as part of the "on-premises" (or local) network while a "cloud host" corresponds to a host residing as part of a public cloud network.

The term "cloud computing infrastructure" generally refers to a networked combination of hardware and software including one or more servers that each include circuitry for managing network resources, such as additional servers and computing devices. The cloud computing infrastructure also includes one or more communication interfaces as well as communication interface logic.

The term "message" generally refers to information in a prescribed format and transmitted in accordance with a suitable delivery protocol. Hence, each message may be in the form of one or more packets, frames, or any other series of bits having the prescribed format.

The term "transmission medium" may be construed as a physical or logical communication path between two or more electronic devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Figure 1:
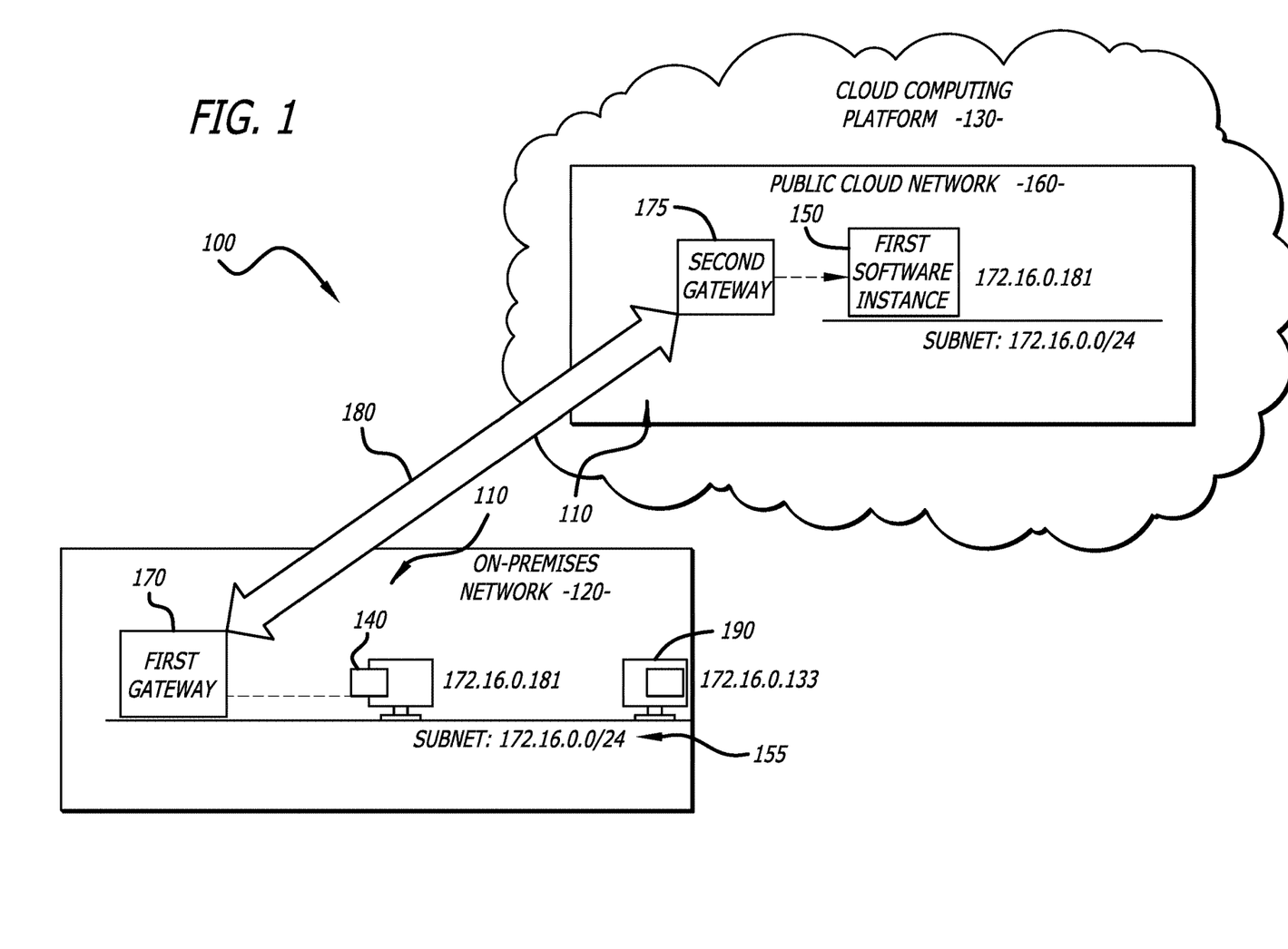
FIG. 1 is a diagram of an exemplary embodiment of a distributed cloud computing system that supports processing of compute jobs on privately owned datacenters.

Referring to FIG. 1, an exemplary embodiment of a system 100 configured with logic 110 that supports a migration of one or more software components (e.g., software application(s), virtual machine(s), etc.) from an on-premises network 120 to a cloud computing platform 130. Herein, a first software component 140 is assigned with a first Internet Protocol (IP) address (e.g., 172.16.0.181) and initially resides in the on-premises network 120. Subsequently, using the logic 110, the first software component 140 is migrated to the cloud computing platform 130, which creates an instance 150 of the first software component 140 (hereinafter, "first software instance"). The first software instance 150 retains the first IP address (e.g., 172.16.0.181) originally assigned to the first software component 140 when residing in the on-premises network 120. By retention of the first IP address by the first software instance 150, a subnet 155 pertaining to the first software component 140 is extended across both the on-premises network 120 and a public cloud network 160 of the cloud computing platform 130.

Supporting migration of the first software component 140 from the on-premises network 120 to the public cloud network 160, the logic 110 includes a first gateway 170 and a second gateway 175. As shown, the first gateway 170 is deployed as part of the on-premises (first) network 120 while the second gateway 175 is deployed as part of the public cloud (second) network 160. The first gateway 170 and the second gateway 175 are configured to establish a secure communication path 180 (e.g., tunnel over DX or IPSec) between these gateways 170 and 175. Hence, the public cloud network 160 is configured sharing a subnet IP address range (e.g., Classless Inter-Domain Routing "CIDR" block) with the on-premises network 120.

Given that a cloud host, such as logic including the first software instance 150 for example (hereinafter, "cloud host 150"), is located on the same subnet as at least one host 190 communicatively coupled to the on-premises network 120 (hereinafter, "on-premises host"), for this embodiment, the second gateway 175 may include logic to resolve a link layer (hardware) address for on-premises host 190. An example of the link layer address includes a media access control (MAC) address assigned to the on-premises host 190. Furthermore, the first gateway 170 may include logic to resolve MAC address for the cloud host 150.

Figure 2:
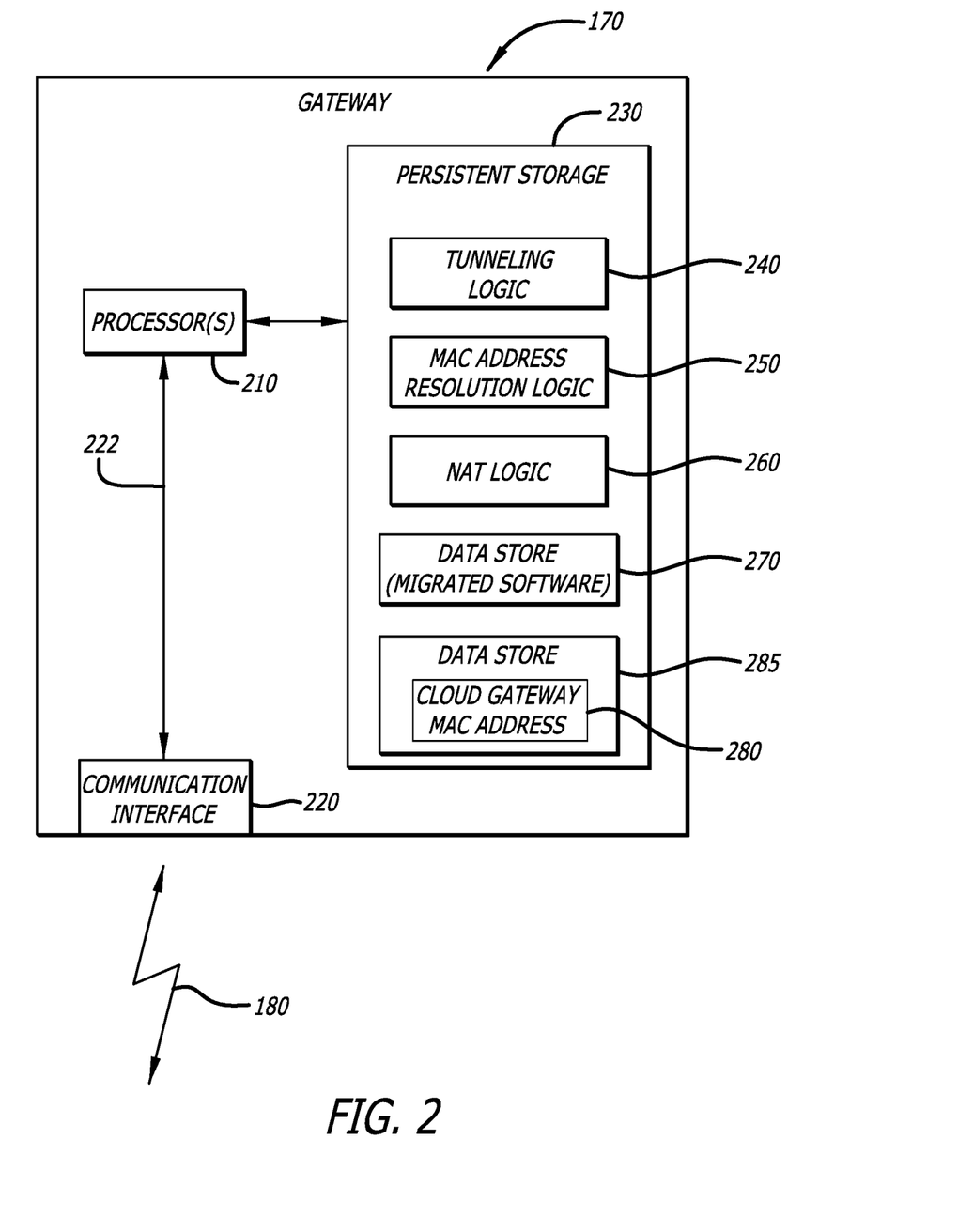
FIG. 2 is an exemplary illustration of the distributed cloud computing system of FIG. 1 including a logical representation of a first embodiment of distributed cloud computing infrastructure.

Referring to FIG. 2, an exemplary illustration of a logical representation of the first gateway 170 of FIG. 1 is shown. In one embodiment, the first gateway 170 may be a virtualized representation, including software to performed the operations described below. Alternatively, the first gateway 170 may include a combination of hardware and software as illustrated in FIG. 2. The hardware components of the first gateway 170 may include circuitry, namely one or more processors ("processor") 210 and the communication interface 220. The hardware may also include the persistent storage 230, e.g., a non-transitory computer-readable storage medium, which may store tunneling logic 240, MAC address resolution logic 250 and network address translation (NAT) logic 260. The tunneling logic 240, MAC address resolution logic 250 and the NAT logic 260 may be executed by the processor 210. The persistent storage 230 further includes a data store 270, which maintains information associated with one or more software components that have migrated to the cloud computing platform, such as the IP address(es) associated with these software component(s).

In particular, the processor 210 may be coupled to the communication interface 220 via a first transmission medium 222. The communication interface 220, in combination with execution of the tunneling logic 240 by the processor 210, establishes the secure communication path 180 of FIG. 1 with the second gateway 175.

The MAC address resolution logic 250, upon execution by the processor 210, is configured to detect an ARP request and accesses content of the data store 270 to determine if the ARP request is directed to a migrated software component (e.g., first software instance 150). If so, the MAC address resolution logic 250 may be configured to generate an ARP reply including a MAC address of the second gateway 175 (hereinafter, "cloud gateway MAC address" 280). The cloud gateway MAC address 280 may be obtained during establishment of the secure communication path 180 and stored within data store 285.

The NAT logic 260, upon execution by the processor 210, is configured to perform translation of the IP addresses for data packets transmitted between the on-premises host and the cloud host using a phantom subnet. Specifically, in the first gateway 170, the NAT logic 260 creates a destination NAT entry to translate the IP address associated with the cloud host (e.g., first software instance 150) from a real IP address associated with the subnet into a temporary IP address associated with a phantom subnet. At the second gateway 175 (not shown), in general terms, an inverse translation is conducted where the temporary IP address associated with the phantom subnet is returned back to the real IP address associated with the subnet. Further discussion of the translation operations are described below.

It is contemplated that the logical architecture of the second gateway 175 includes logic similar to the first gateway 170, except the functionality of the MAC address resolution logic differs. More specifically, upon execution by the processor 210, the MAC address resolution logic is configured as a proxy interface on the second gateway 175 in a public cloud subnet with the same IP address. The proxy interface enables the public cloud infrastructure to identify an on-premises host targeted by an ARP request message initiated by a cloud host 150 and issue an ARP reply message. The proxy interface will then communicate with the cloud host 150 in the public cloud subnet on behalf of the on-premises host 190 and forward traffic to and from the on-premises host 190.

According to one embodiment of the disclosure, the communication interface 220 may be implemented as a physical interface including one or more ports for wired connectors. Additionally, or in the alternative, the communication interface 220 may be implemented as a virtual network interface being an abstract virtual representation of a network.

III. Operational Flow

Figure 3:
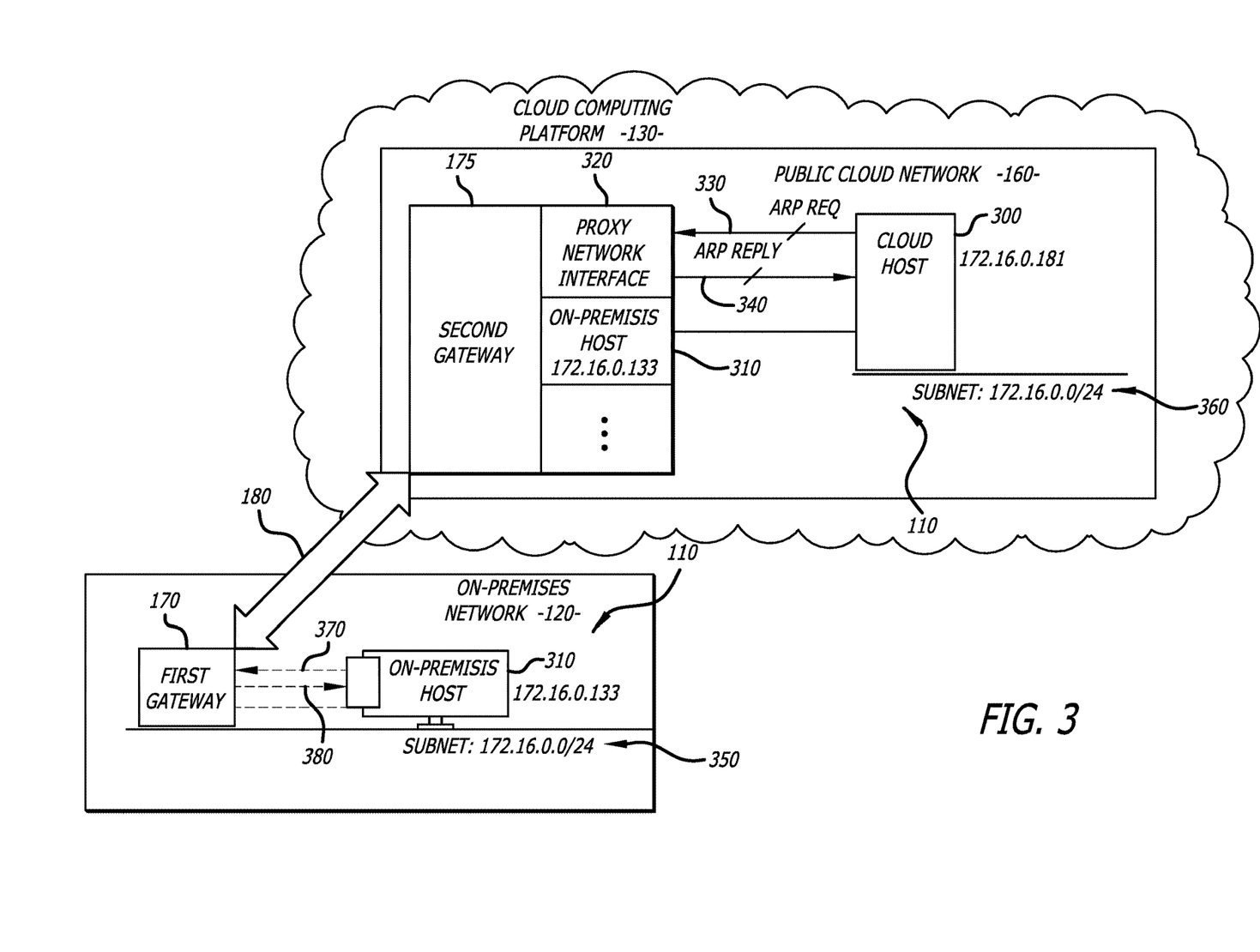
FIG. 3 is an exemplary flowchart illustrating the operations performed by the distributed cloud computing infrastructure of FIG. 2 involved in completing compute job requests.

Herein, according to one embodiment of the disclosure, an operational flow of communications between (i) a cloud host 300, such as logic including the migrated software component 150 for example, operating within a cloud computing platform 130 and (ii) on-premises host 310 operating within the on-premises network 120 is shown. The on-premises network 120 includes the first gateway 170 while the public cloud network 160 of the cloud computing platform 130 deploys the second gateway 175. In accordance with a selected secure network protocol scheme, such as IP Security (IPSec), the first gateway 170 and the second gateway 175 establish the secure communication path 180 thereby extending the IP subnet (e.g., subnet 172.16.0.0/24) of the on-premises (first) network 120 to the public cloud (second) network 160.

Herein, according to one embodiment of the disclosure, in order to resolve a link layer (MAC) address of the on-premises host 310 to effectuate communications from the cloud host 300, a proxy network interface 320 for each on-premises host may be provided on the second (cloud) gateway 175. This will allow the public cloud infrastructure to become aware of the on-premises host 310, where the proxy network interface 320 may issue ARP reply messages 340 in response to ARP request messages 330 from the cloud host 300. The proxy network interface 320 is configured to communicate with cloud hosts (e.g., cloud host 300) on behalf of the on-premises hosts (e.g., on-premises host 310) and exchange content (e.g., one or more packets or other types of digital data) between the cloud hosts and the on-premises hosts.

As an alternative embodiment, although not shown, a "proxy by host" method of operation may be performed. Herein, for each host in on-premises subnet 350, create a proxy host or network interface in the public cloud subnet 360 with the same IP address. This will allow the public cloud infrastructure to be aware of the on-premises host 310 and issue an ARP reply to ARP requests from cloud hosts. The proxy host will then communicate with the cloud hosts on behalf of the on-premises hosts and forward traffic between the proxy host and the on-premises host.

As an alternative embodiment, a "proxy by cloud infrastructure" method of operation may be performed. Herein, for each on-premises host, the underlying cloud infrastructure in public cloud subnet with the same IP address may be modified. Such modification would allow the public cloud infrastructure to be aware of the on-premises host and reply to ARP requests from cloud host(s). The underlying cloud infrastructure will then communicate with the cloud host on behalf of the on-premises host and forward traffic between the on-premises host and the public cloud infrastructure.

As yet another alternative embodiment, a "ARP spoofing in cloud" method of operation may be performed. Herein, for each on-premises host, an ARP entry is generated in every host in the public cloud. The ARP entries will resolve IP address of on-premises host to the hardware address of the second gateway 175. Prior to sending one or more packets to on-premises host, the cloud host may conduct a look up of an ARP table and send the packet to the second gateway 175 without sending an ARP request first. The second (cloud) gateway 175 will forward all traffic to on-premises hosts through the first (on-premises) gateway 170. Herein, an agent may be installed on one or more on-premises hosts to manage the ARP entries continuously through a central portal, which includes information that identifies whether a host (e.g., system) belonging to the subnet is located in the on-premises network 120 or public cloud network 160.

Similarly to the discussion described above, in order to resolve a link layer address (e.g., MAC address) of the cloud host 300, the first (on-premises) gateway 170 is configured to issue an ARP reply message 380 in response to an ARP request message 370 from an on-premises host 310 requesting access to the cloud host 300. The ARP reply message 380 may include a MAC address of the second (cloud) gateway (hereinafter, "cloud gateway MAC address").

As an alternative embodiment, for each public cloud subnet, an ARP entry for each on-premises host is created to resolve an IP address of a cloud host to the hardware address of the second gateway 175 (e.g., cloud gateway MAC address). When the on-premises host 310 wants to send one or more packets to the cloud host 300, the on-premises host 310 conducts a look up of its ARP table and sends the packet(s) to the second gateway 175 without initially sending an ARP request. The first gateway 170 will forward all traffic from on-premises hosts to the second gateway 175. Additionally, an agent may be installed one or more on-premises hosts to manage the ARP entries continuously through a central portal, which include information that identifies whether a host (e.g., system) belonging to the subnet is located in the on-premises network 120 or public cloud network 160.

Figure 4:
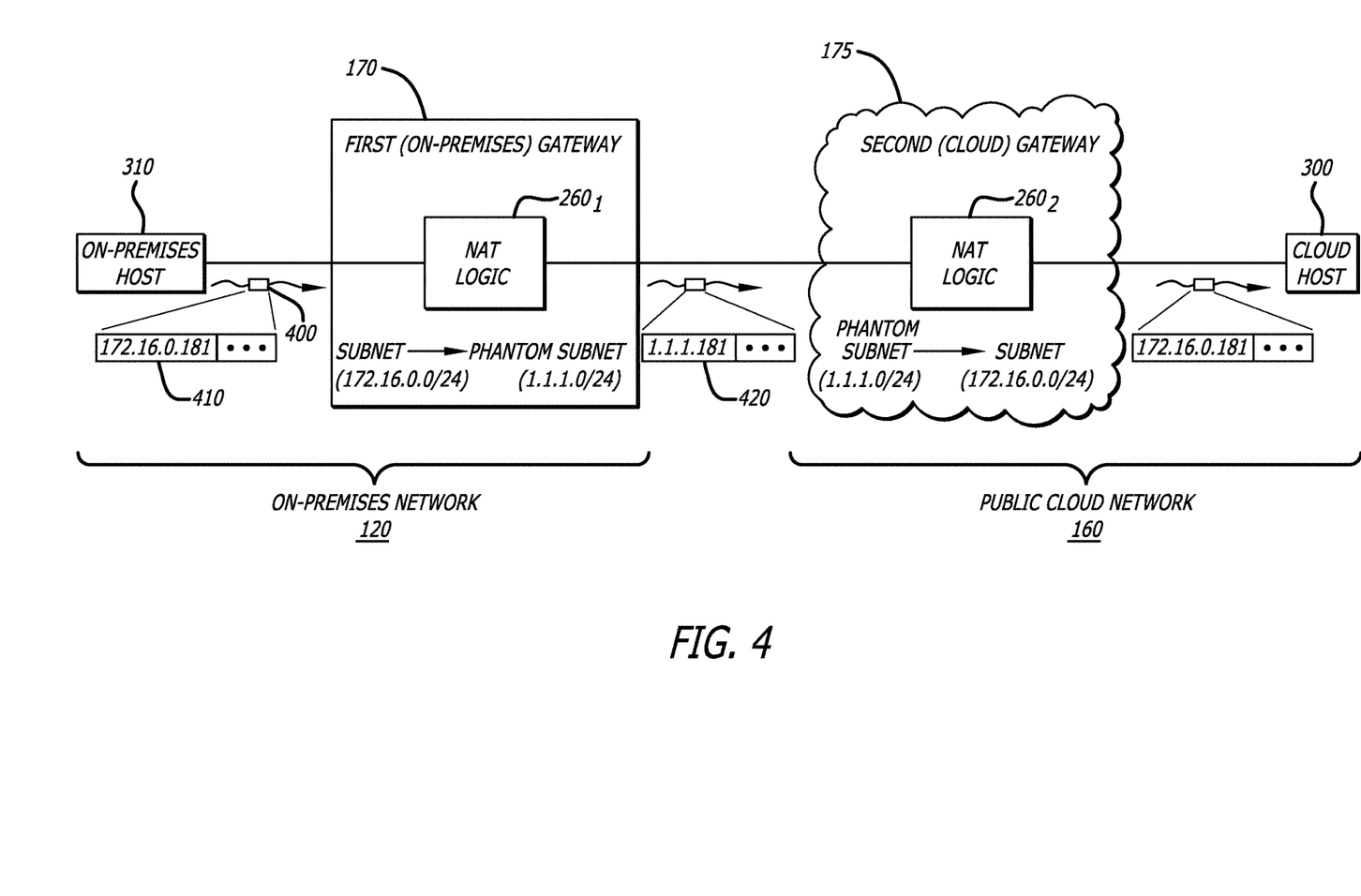
FIG. 4 is a second exemplary flowchart illustrating the operations involved in completing compute job requests according to performance of operations by the logical components of the distributed cloud computing infrastructure of FIG. 2.

After both the cloud host 310 and the on-premises host 300 have been resolved, as shown in FIG. 4, NAT logic $260_1$-$260_2$ may be used by both the first gateway 170 and the second gateway 175 for routing of data packets between an implementation of a subnet spanning across the on-premises network and the public cloud network. More specifically, the first gateway 170 includes NAT logic $260_1$ that is configured to translate an IP address of the subnet to a phantom IP subnet address before routing each data packet to the second gateway. More specifically, the NAT logic $260_1$ for the first gateway 170 is configured to translate an IP address 410 each data packet 400 from the on-premises host 310 residing within a subnet (with a prescribed subnet IP address range). For illustrative example, the IP address 410 is represented by CIDR block notation "172.16.0.181," with the subnet represented as "172.16.0.0/24" while a phantom IP address 420 is represented by CIDR block notation "1.1.1.181," with the phantom subnet represented as "1.1.1.0/24." Thereafter, the first gateway 170 routes the translated data packet(s) are received by the second gateway 175. Similarly, the second gateway 170 includes NAT logic $260_2$, which that is configured to translate the IP address of the data packet from the phantom IP address (1.1.1.181) to the IP subnet address (e.g., 172.16.0.181, for subnet 172.16.0.0/24). This translation is performed to enable the routing of data packets over the same subnet.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A system supporting migration of an instance of a software component from an on-premises network to a public cloud network, comprising:
   a processor;
   a first gateway deployed as part of the on-premises network, the first gateway including a network address translation (NAT) logic configured to translate an Internet Protocol (IP) address associated with the instance of the software component from an on-premises host residing within a first subnetwork of the on-premises network to a temporary IP address associated with a second subnetwork being a phantom subnetwork; and
   a second gateway deployed as part of the public cloud network and communicatively coupled to the first gateway, the second gateway including NAT logic to translate the temporary IP address to the IP address, wherein address control logic within the second gateway is configured to resolve a media access control (MAC) address for the on-premises host connected to the on-premises network by at least configuring a subnetwork of the public cloud network including the second gateway to share a subnet IP address range with the first subnetwork of the on-premises network, and
   migration of the instance of the software component from the on-premises network to the public cloud network is conducted by installing the instance of the software component on the public cloud network with an IP address that is identical to the IP address previously assigned to the instance of the software component.

2. The system of claim 1, wherein the first gateway is configured to resolve a MAC address for a cloud host connected to the public cloud network.

3. The system of claim 2, wherein the first gateway is configured to resolve the MAC address for the cloud host by at least the first gateway issuing an Address Resolution Protocol (ARP) reply message in response to an ARP request message from the on-premises host requesting access to the public cloud network, the ARP reply message includes the MAC address of the second gateway.

4. The system of claim 1, wherein the public cloud network is configured to share a Classless Inter-Domain Routing (CIDR) block with the on-premises network.

5. The system of claim 1, wherein the first gateway includes circuitry and software that control operability of the first gateway.

6. The system of claim 1, wherein the IP address of the instance of the software component is assigned while the instance of the software component is stored on a local storage of the on-premises network.

7. The system of claim 1, wherein the first gateway is communicatively coupled to the second gateway via a secure communication path that includes an Internet Protocol Security (IPSEC) tunnel.

8. The system of claim 1, wherein the processor is configured to execute the NAT logic being stored within a non-transitory storage medium associated with the first gateway.

9. A system supporting migration of an instance of a software component from an on-premises network operating as an enterprise network to a public cloud network, comprising:
   a processor;
   a first gateway deployed as part of the on-premises network, the first gateway configured to translate an Internet Protocol (IP) address associated with the instance of the software component from an on-premises host residing within a first subnetwork of the on-premises network to a temporary IP address associated with a second subnetwork being a phantom subnetwork; and
   a second gateway deployed as part of the public cloud network and communicatively coupled to the first gateway, the second gateway being configured to translate the temporary IP address to the IP address,
   wherein to support migration of the instance of the software component to the public cloud network, the second gateway is configured to resolve a linked layer address for an on-premises host connected to the on-premises network and the first gateway is configured to resolve a linked layer address for a cloud host connected to the public cloud network, and during migration of the instance of the software component from the on-premises network to the public cloud network, the IP address assigned to the instance of the software component is retained as the IP address for the instance of the software component installed on the public cloud network.

10. The system of claim 1, wherein the first gateway operates as a virtual appliance.

11. The system of claim 10, wherein the first gateway is deployed on a subnet from which the instance of the software component is to be migrated.

12. The system of claim 10, wherein the second gateway is a software component launched on a virtual public cloud subnet and in secure communications with the first gateway.

13. The system of claim 9, wherein the processor is included as part of the on-premises host corresponding to an electronic device.

14. The system of claim 13, wherein address control logic within the second gateway is configured to resolve the linked layer address for the on-premiese host by at least configuring a subnetwork of the public cloud network including the second gateway to share a subnet IP address range with the first subnetwork.

15. The system of claim 13, wherein the first gateway is configured to resolve the linked list address for the cloud host by at least the first gateway issuing an Address Resolution Protocol (ARP) reply message in response to an ARP request message from the on- premises host requesting access to the public cloud network, the ARP reply message includes the linked list address of the second gateway.

16. The system of claim 13, wherein the public cloud network is configured to share a Classless Inter-Domain Routing (CIDR) block with the on-premises network.

17. The system of claim 13, wherein the second subnetwork is different than the first subnetwork.

18. The system of claim 17, wherein the temporary IP address is translated to the IP address associated with the public cloud network by NAT logic within the second gateway.

19. The system of claim 13, wherein the second gateway is communicatively coupled to the first gateway via a secure communication path that includes an Internet Protocol Security (IPSEC) tunnel.

20. The system of claim 13, wherein the linked layer address for the on-premises host includes a Media Access Control (MAC) address of the on-premises host and the linked layer address for the cloud host includes a MAC address of the cloud host.

21. The system of claim 13, wherein the first gateway operates as a virtual appliance.

22. The system of claim 21, wherein the first gateway is deployed on a subnet of the on-premises network.

23. A method for supporting migration of instance of a software component between an on-premises network and a public cloud network while preserving an Internet Protocol (IP) address assigned to the instance of the software component, comprising:

resolving a linked layer address for an on-premises host connected to the on-premises network;

translating the IP address associated with the instance of the software component from the on- premises host residing within a first subnetwork of the on-premises network to a temporary IP address associated with a second subnetwork being a phantom subnetwork; and translating the temporary IP address to the IP address so that, during migration of the instance of the software component from the on-premises network to the public cloud network, the IP address assigned to the instance of the software component is retained as the IP address for the instance of the software component installed on the public cloud network, wherein the resolving of the linked layer address includes at least configuring a subnetwork of the public cloud network to share a subnet IP address range with the first subnetwork of the on-premises network.

24. The method of claim 23, wherein the public cloud network is configured to share a Classless Inter-Domain Routing (CIDR) block with the on-premises network.

25. The method of claim 23, wherein the translating of the IP address to the temporary IP address is conducted by network address translation (NAT) logic within a first gateway deployed within the on-premises network.

26. The method of claim 25, wherein the translating of the temporary IP address to the IP address is conducted by network address translation (NAT) logic within a second gateway deployed within the public cloud network.

27. The method of claim 23 further comprising:

resolving a linked layer address for a cloud host associated with the public cloud network by at least issuing an Address Resolution Protocol (ARP) reply message in response to an ARP request message from the on-premises host requesting access to the public cloud network, the ARP reply message includes a MAC address of the second gateway deployed within the public cloud network.

\* \* \* \* \*